United States Patent
Chan et al.

(10) Patent No.: US 11,042,495 B2
(45) Date of Patent: Jun. 22, 2021

(54) PROVIDING INTERRUPTS FROM AN INPUT-OUTPUT MEMORY MANAGEMENT UNIT TO GUEST OPERATING SYSTEMS

(71) Applicants: Advanced Micro Devices, Inc., Santa Clara, CA (US); ATI Technologies ULC, Markham (CA)

(72) Inventors: Maggie Chan, Toronto (CA); Philip Ng, Toronto (CA); Paul Blinzer, Bellevue, WA (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/578,165

(22) Filed: Sep. 20, 2019

(65) Prior Publication Data
US 2021/0089480 A1    Mar. 25, 2021

(51) Int. Cl.
*G06F 13/24* (2006.01)
*G06F 9/455* (2018.01)
*G06F 13/16* (2006.01)

(52) U.S. Cl.
CPC .......... *G06F 13/24* (2013.01); *G06F 9/45558* (2013.01); *G06F 13/1668* (2013.01); *G06F 2009/45579* (2013.01)

(58) Field of Classification Search
CPC .. G06F 13/24; G06F 13/1668; G06F 9/45558; G06F 2009/45579
See application file for complete search history.

(56) References Cited

U.S. PATENT DOCUMENTS

| | | | | |
|---|---|---|---|---|
| 2003/0026260 | A1* | 2/2003 | Ogasawara | H04L 29/06 370/392 |
| 2012/0250682 | A1* | 10/2012 | Vincent | H04L 12/4633 370/390 |
| 2015/0220354 | A1* | 8/2015 | Nair | G06F 9/45533 710/301 |
| 2016/0077848 | A1* | 3/2016 | Tu | G06F 9/45558 718/1 |

OTHER PUBLICATIONS

Advanced Micro Devices, Inc., AMD I/O Virtualization Technology (IOMMU) Specification, rev. 3.00, Dec. 2016.

* cited by examiner

*Primary Examiner* — Henry Tsai
*Assistant Examiner* — John B Roche
(74) *Attorney, Agent, or Firm* — Park, Vaughan, Fleming & Dowler LLP

(57) ABSTRACT

An electronic device includes a processor that executes a guest operating system; a memory having a guest portion that is reserved for storing data and information to be accessed by the guest operating system; and an input-output memory management unit (IOMMU). The IOMMU performs operations for signaling an interrupt to the guest operating system. For these operations, the IOMMU acquires, from an entry in an interrupt remapping table associated with the guest operating system, a location in a virtual advanced programmable interrupt controller (APIC) backing page for the guest operating system in the guest portion of the memory. The IOMMU then writes information about the interrupt to the location in the virtual APIC backing page. The IOMMU next communicates an indication of the interrupt to the guest operating system.

24 Claims, 9 Drawing Sheets

PROVIDING INTERRUPTS FROM AN INPUT-OUTPUT MEMORY MANAGEMENT UNIT TO GUEST OPERATING SYSTEMS

BACKGROUND

Related Art

Some electronic devices (e.g., server or desktop computers, etc.) support "virtualization" of electronic device hardware such as input-output (IO) devices, etc. Virtualization involves an intermediary entity on or in the electronic device providing, to instances of software executing on the electronic device (e.g., application programs, etc.), the illusion that the instances of software are able to access electronic device hardware directly, when, in reality, the intermediary entity intercepts/redirects or otherwise assists with accesses made by the instances of software. One common intermediary entity is a "virtual machine." Virtual machines are software entities that abstract electronic device hardware and emulate or present a known interface to electronic device hardware, thereby enabling instances of software to execute on various types and arrangements of underlying electronic device hardware—possibly including electronic device hardware with which the instances of software would otherwise not be compatible. In some electronic devices, virtual machines provide support for executing one or more instances of operating systems, called "guest" operating systems. Guest operating systems in turn provide environments for executing other instances of software such as productivity applications, databases, etc.

In some electronic devices, virtual machines are managed and controlled by a software entity known as a hypervisor. Hypervisors may start or initialize virtual machines; control, monitor, and assist with accesses of electronic device hardware by virtual machines; terminate or close virtual machines; etc. FIG. 1 presents a block diagram illustrating virtual machines and a hypervisor. As can be seen in FIG. 1, there are three virtual machines (VM) 100, under each of which executes a guest operating system (GUEST OS) 102 and one or more programs (PRGRMS) 104, such as databases, software applications, etc. Virtual machines 100 communicate with hypervisor 106, which interfaces between a host operating system (HOST OS) 108 and virtual machines 100. Host operating system 108 provides an interface between electronic device hardware 110 and hypervisor 106. In addition, hypervisor 106 interfaces between virtual machines 100 and input-output management unit (IOMMU) 112, with IOMMU 112 serving as a memory management unit and controller for IO device hardware 114.

Among the operations performed by hypervisors is the handling of communications between electronic device hardware and guest operating systems (or, more broadly, virtual machines). For example, a hypervisor may translate, redirect, or otherwise assist with communications between guest operating systems and an input-output management unit (IOMMU). The communications handled by the hypervisor include communications such as peripheral page request (PPR) log and event log writes by the IOMMU and command buffer writes by the guest operating systems. PPR log, event log, and command buffer writes are described in detail in the AMD I/O Virtualization Technology (IOMMU) Specification, rev. 3.00, December 2016, which is incorporated by reference herein in its entirety.

FIG. 2 presents a block diagram illustrating communications between a guest operating system and an IOMMU that are handled by the hypervisor. In FIG. 2, a number of elements are shown dotted/stippled; these elements are logs, buffers, etc. that are stored in a memory (e.g., a main memory for the electronic device) and thus accessed via typical memory access techniques. The elements in FIG. 2, along with guest operating system 102, hypervisor 106, and IOMMU 112, include guest peripheral page request (PPR) log 200, guest command buffer (CMD BUF) 202, and guest event log 204, which are structures (e.g., lists, tables, etc.) in memory that are used for storing data and information for guest operating system 102 and other entities in the electronic device. In addition, the elements include guest pointers (PTRS)/status registers (REGS) 206, which are a set of locations in memory for storing pointers to guest operating system structures and status information associated with the guest operating system. The elements also include IOMMU peripheral page request (PPR) log 208, IOMMU command buffer 210, and IOMMU event log 212, which are structures (e.g., lists, tables, etc.) in memory that are used for storing communications from and destined for IOMMU 112. The elements additionally include IOMMU memory mapped input-output (MMIO) pointers/status registers (REGS) 214 in IOMMU 112, which are a set of registers in IOMMU 112 for storing pointers to various IOMMU 112 structures and status information associated with the IOMMU 112. The elements further include virtual advanced programmable interrupt controller (APIC) backing page 216 and guest interrupt log 218, which are structures that are used for communicating information about IOMMU-sourced interrupts from the IOMMU to the guest operating system via hypervisor 106.

In operation, and using a command as an example, guest operating system 102 writes a command destined for IOMMU 112 to guest command buffer 202 (i.e., to a next available location in the buffer in memory where commands from guest operating system 102 are stored). Hypervisor 106, as shown via a dotted line in FIG. 2, detects the guest operating system's write to guest command buffer 202, acquires and processes the command (e.g., replaces a guest domainID and/or guest deviceID in the command with a corresponding host domainID and/or deviceID, etc.), and stores the processed command in IOMMU command buffer 210. Hypervisor 106 also updates a tail pointer in IOMMU MMIO pointers/status registers 214 for IOMMU command buffer 210 to indicate the newly written command (e.g., increments the tail pointer to a next location in IOMMU command buffer 210). IOMMU 112 then uses the tail pointer (and/or other pointers) to retrieve the command from IOMMU command buffer 210 and executes the command, which causes IOMMU 112 to perform a corresponding action. Hypervisor 106 performs similar operations for IOMMU 112 writes to IOMMU peripheral page request log 208 and to IOMMU event log 212 (e.g., replacing host deviceIDs with guest deviceIDs, etc.). Because the memory reads and writes, the updates of the pointer, and the other operations performed by hypervisor 106 are longer latency, using hypervisor 106 to intervene between guest operating system 102 and IOMMU 112 leads to delay in processing communications, as well as causing the processor to be busy and adding traffic on a memory bus in the electronic device.

In operation, IOMMU 112 communicates IOMMU-sourced interrupts such as interrupts based on events, faults, or errors to guest operating system 102 indirectly. More specifically, IOMMU 112 communicates interrupts to guest operating system 102 via hypervisor 106—and does not directly communicate interrupts to guest operating system 102. For communicating an interrupt to guest operating system 102, IOMMU 112 signals the interrupt to hypervisor

106. Hypervisor 106 then writes information about the interrupt in virtual APIC backing page 216 and signals the occurrence of the interrupt to guest operating system 102. For example, hypervisor 106 may set one or more interrupt request register bits associated with the interrupt in virtual APIC backing page 216 and then assert a doorbell signal or write a shared memory location to signal the occurrence of the interrupt to guest operating system 102. Upon receiving the signal from hypervisor 106, guest operating system 102 acquires the information about the interrupt from virtual APIC backing page 216 and processes the interrupt. In some electronic devices, guest operating system 102 may be in an inactive state (e.g., switched out while another guest operating system executes) when an interrupt occurs. In this case, hypervisor 106 adds information about the interrupt to guest interrupt log 218, the information to be used for processing the interrupt when guest operating system 102 returns to an active state. As with other types of communications, relying on hypervisor 106 as an interface for interrupt processing leads to longer processing time for interrupts, more memory bus traffic, etc.

BRIEF DESCRIPTION OF THE FIGURES

Throughout the figures and the description, like reference numerals refer to the same figure elements.

DETAILED DESCRIPTION

Figure 1:
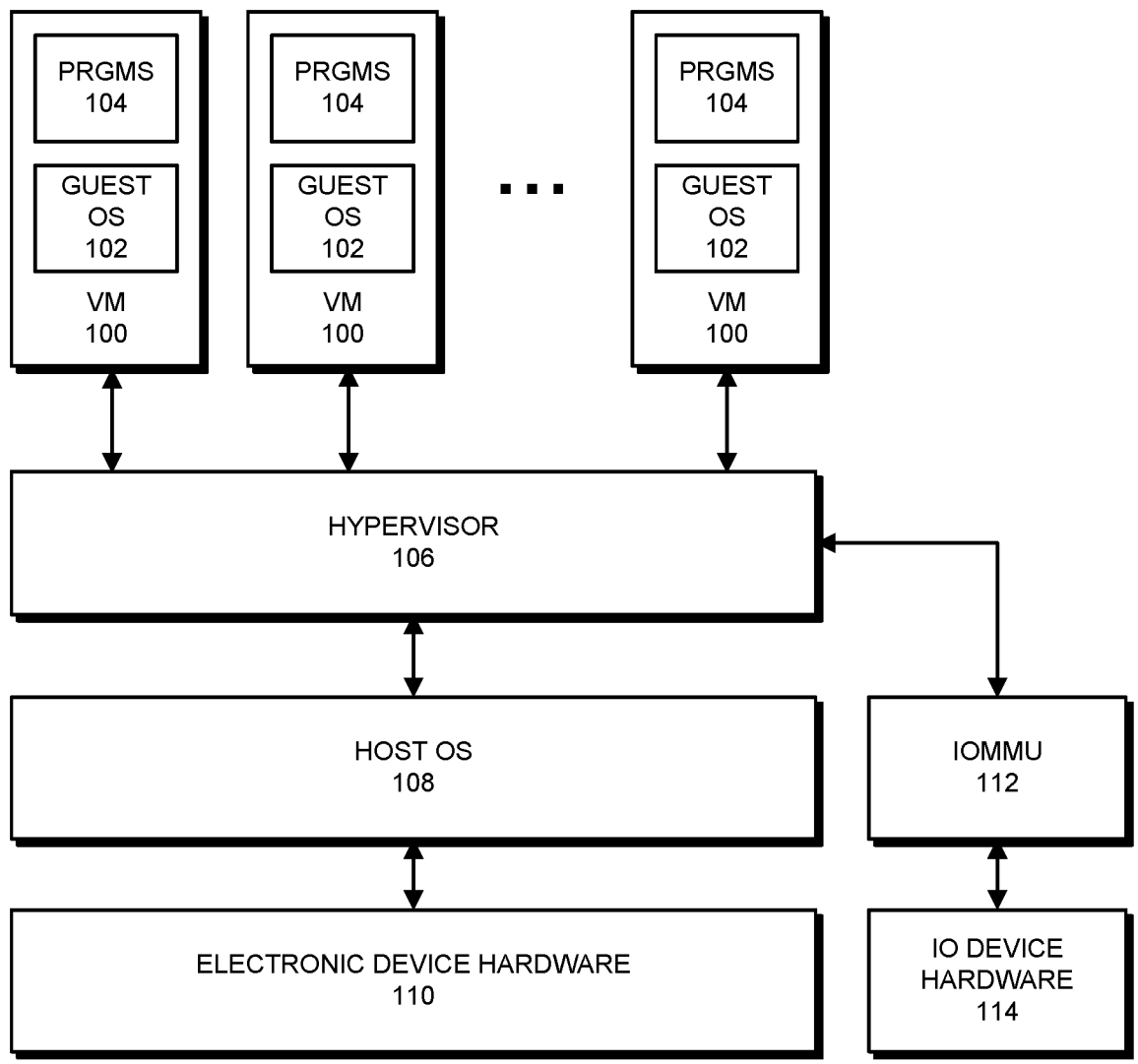
FIG. 1 presents a block diagram illustrating virtual machines and a hypervisor.

The following description is presented to enable any person skilled in the art to make and use the described embodiments and is provided in the context of a particular application and its requirements. Various modifications to the described embodiments will be readily apparent to those skilled in the art and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Virtualization, Virtual Machines, and Hypervisors

The described embodiments support "virtualization" of electronic device hardware such as memories, input-output (IO) devices, etc. Virtualization generally involves an intermediary entity on or in the electronic device providing, to instances of software executing on the electronic device, the illusion that the instances of software are able to access electronic device hardware directly, when, in reality, the intermediary entity intercepts/redirects, translates, or otherwise assists with accesses made by the instances of software. For example, an instance of software may be presented, by an intermediary entity, with a set of electronic device registers, memory locations, electronic device settings, and other functional blocks that appear to the instance of software to be actual device registers, memory locations, etc. of an electronic device, but instead are merely copies that are presented by the intermediary entity. In this case, the intermediary entity receives, intercepts, or otherwise acquires accesses of the copies of electronic device hardware and makes corresponding interactions with actual electronic device hardware on behalf of the instance of software. The virtualization of electronic device hardware has a number of benefits, such as enabling different electronic devices to use different arrangements of electronic device hardware, different addresses, locations, or identifiers for electronic device hardware, etc., while instances of software are presented, via the intermediary entities, with the same interfaces to electronic device hardware. In addition, intermediary entities may determine whether to allow or block accesses of electronic device hardware by given instances of software, and thus virtualization of electronic device hardware enables protection of electronic device hardware (or portions thereof) and/or instances of software executing on the electronic devices. By controlling access as described, the intermediary entities may share electronic device hardware between a number of instances of software and/or provide exclusive access to portions of electronic device hardware to individual instances of software.

In the described embodiments, the intermediary entities include "virtual machines." Virtual machines are software entities that abstract electronic device hardware and present, to instances of software, a known interface to actual or emulated electronic device hardware. Abstracting the hardware enables the instances of software to execute on various types and arrangements of underlying electronic device hardware—possibly including electronic device hardware with which the instances of software would otherwise not be compatible. In the described embodiments, virtual machines provide support for executing one or more instances of operating systems, called "guest" operating systems. Guest operating systems in turn provide environments for executing other software programs such as applications, databases, etc.

Figure 3:
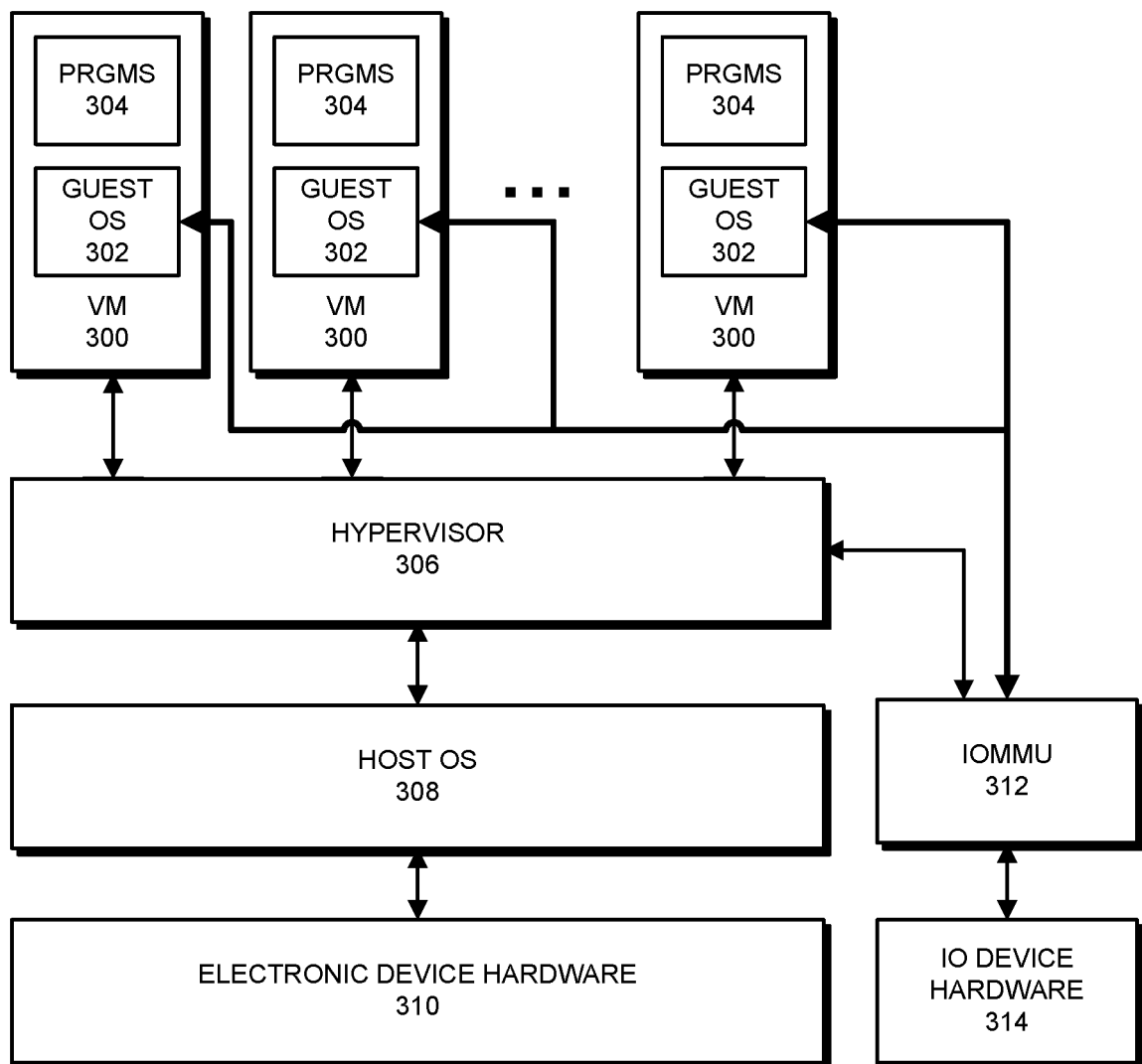
FIG. 3 presents a block diagram illustrating virtual machines and a hypervisor in accordance with some embodiments.

In the described embodiments, virtual machines are managed and controlled by a software entity known as a hypervisor. Hypervisors may start or initialize virtual machines; control, monitor, and assist with accesses of electronic device hardware by virtual machines; initialize data structures, tables, etc. used by virtual machines or guest operating systems; terminate or close virtual machines; etc. FIG. 3 presents a block diagram illustrating virtual machines and a hypervisor in accordance with some embodiments. As can be seen in FIG. 3, there are three virtual machines (VM) 300, under each of which executes a guest operating system (GUEST OS) 302 and one or more programs (PRGRMS) 304, such as databases, software applications, etc. Virtual machines 300 communicate with hypervisor 306, which interfaces between a host operating system (HOST OS) 308 and virtual machines 300. Host operating system 308 provides an interface between electronic device hardware 310 and hypervisor 306. Differently than what is shown in FIG. 1 for existing electronic devices, in FIG. 3, IOMMU 312 interfaces directly between guest operating systems 302 and IO device hardware 314, without hypervisor 306 intervening (as shown by the heavier line between IOMMU 312 and guest operating systems 302). Unlike in existing electronic devices, therefore, in the described embodiments, hypervisor 306 is not responsible for performing at least some of the operations for handling communications between guest operating systems 302 and IOMMU 312, as described herein. Note, however, that certain communications occur between IOMMU 312 and hypervisor 306, as shown by the line between hypervisor 306 and IOMMU 312. In addition, note that, in some embodiments, host operating system 308 is not present and hypervisor 306 communicates more directly with electronic device hardware 310.

Overview

In the described embodiments, an electronic device includes a processor, a memory (e.g., a main memory), a number of input-output (IO) devices (e.g., a network interface device, a disk controller, etc.), and an input-output memory management unit (IOMMU) that interfaces between the processor and the IO devices. The processor executes a hypervisor, one or more virtual machines, and, in the virtual machines, guest operating systems. Each of the guest operating systems is allocated a guest portion of the memory (a contiguous or non-contiguous region or block of memory) that is reserved for storing data and information to be accessed by that guest operating system. In the described embodiments, the IOMMU performs operations for handling communications between guest operating systems and the IOMMU and vice versa.

In some embodiments, as part of the operations for handling communications between guest operating systems and the IOMMU, the IOMMU communicates information about interrupts directly to guest operating systems. In other words, the IOMMU performs operations for signaling, to guest operating systems, that IOMMU-sourced interrupts—which can be generated by the IOMMU itself or based on activities of IO devices or other entities—are awaiting processing or handling by the guest operating systems. Guest operating systems, upon receiving information about an interrupt from the IOMMU, perform operations for processing or handling the IOMMU-sourced interrupt. By "directly" communicating information about IOMMU-sourced interrupts from the IOMMU to guest operating systems as used herein, it is meant that operations for communicating the information about the interrupts are performed without the involvement of the hypervisor for active/running guest operating systems. The hypervisor may, however, handle some of the operations of communicating information about IOMMU-sourced interrupts to operating systems that are inactive.

In some embodiments, the IOMMU communicates information about IOMMU-sourced interrupts to guest operating systems via respective virtual advanced programmable interrupt controller (APIC) backing pages in guest portions of the memory. Generally, each virtual APIC backing page is a portion of memory (e.g., one or more 4 kB pages of memory) that is used for virtualizing an APIC functional block in the electronic device for a corresponding guest operating system. Virtual APIC backing pages include a number of locations (e.g., entries, portions, etc.) that are used by a hypervisor and other entities for emulating registers, memory locations, control values, etc. of the APIC functional block to enable guest operating systems to receive and process or handle interrupts. APICs, virtualization of APICs, and virtual APIC backing pages are described, for example, in the AMD64 Architecture Programmer's Manual Volume 2: System Programming, rev. 3.30, September 2018, which is incorporated by reference herein in its entirety. In some embodiments, each guest operating system's virtual APIC backing page includes, in addition to the previously-known interrupt control and communication locations, one or more locations that are dedicated to and used for storing information about specified IOMMU-sourced interrupts. For example, in some embodiments, the virtual APIC backing page for each guest operating system includes a separate location (e.g., entry, portion, etc.) for each different type of IOMMU-sourced interrupt that can be processed by that guest operating system. As another example, in some embodiments, the virtual APIC backing page for each guest operating system includes a single combined location for all different types of IOMMU-sourced interrupts that can be processed by that guest operating system.

In some embodiments, the IOMMU uses an interrupt remapping table for determining locations in virtual APIC backing pages where information about interrupts is to be written in for signaling interrupts to guest operating systems. Generally, the interrupt remapping table is a table stored in memory that includes a number of entries, each entry used for storing an identifier (e.g., address, offset, etc.) for a location in memory where information about a specified interrupt is to be written. Interrupt remapping tables are described, for example, in the AMD I/O Virtualization Technology (IOMMU) Specification, rev. 3.00, December 2016, which, as described above, is incorporated by reference herein. In these embodiments, in addition to the previously-known entries in the interrupt remapping table, the interrupt remapping table includes entries for storing the identifiers for the above-described locations in the virtual APIC backing page for each guest operating system.

In some embodiments, during operation, when the IOMMU encounters an IOMMU-sourced interrupt destined for a given guest operating system, the IOMMU acquires, from the interrupt remapping table, an identifier for a location in a virtual APIC backing page for the given guest operating system into which information about the interrupt is to be written. The IOMMU then uses the identifier to write the information about the interrupt into the location in the virtual APIC backing page for the given guest operating system. The IOMMU also communicates an indication of the interrupt to the given guest operating system, the indication causing the given guest operating system to retrieve the information about the interrupt from the location in the virtual APIC backing page and process or handle the interrupt. In some embodiments, the mechanism used for communicating the indication of the interrupt to the given guest operating system depends on an active/inactive state of the guest operating system—i.e., whether the processor is currently executing the given guest operating system or performing another task with the given guest operating system temporarily inactive. The mechanisms are described in more detail below.

By having the IOMMU write information about IOMMU-sourced interrupts to virtual APIC backing pages for guest operating systems and communicate the indications of the interrupts to guest operating systems, thereby communicating the interrupts directly to the guest operating systems, the described embodiments avoid the need, as found in existing systems, for relying on the hypervisor for the processing of the IOMMU-sourced interrupts. Removing these operations from the hypervisor (implemented in software) to the IOMMU (implemented in hardware) speeds up the operations, requires less memory system bandwidth, and puts less load on computational functional blocks in the processor, which improves the overall performance of the electronic device. The improved performance of the electronic device leads to higher user satisfaction.

Electronic Device

Figure 4:
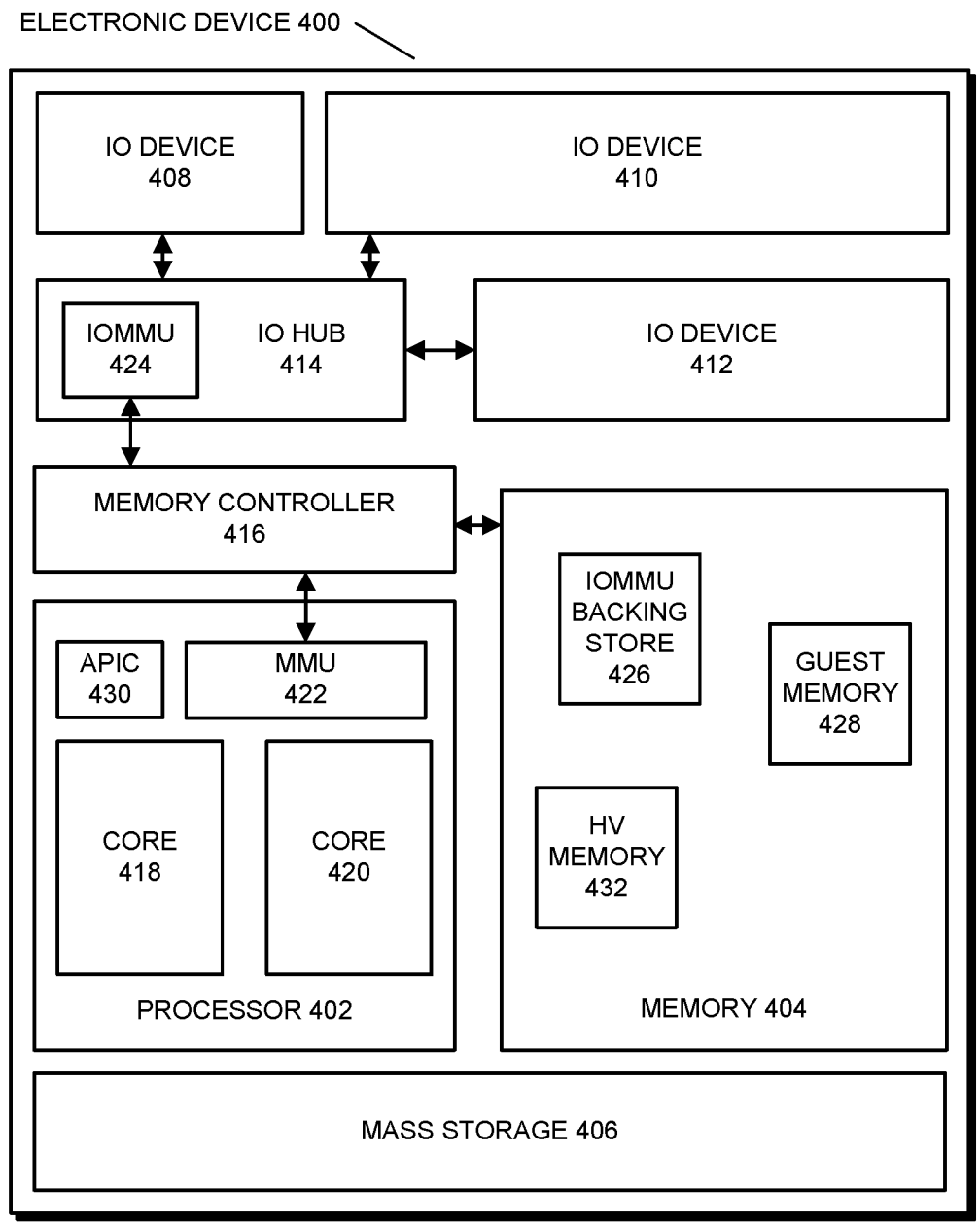
FIG. 4 presents a block diagram illustrating an electronic device in accordance with some embodiments.

FIG. 4 presents a block diagram illustrating electronic device 400 in accordance with some embodiments. As can be seen in FIG. 4, electronic device 400 includes processor 402, memory 404, mass storage 406, input-output (IO) devices 408-412, input-output (IO) hub 414, and memory controller 416.

Processor 402 is a functional block that performs computational and other operations in electronic device 400. Processor 402 includes two cores 418-420, each of which includes one or more computational mechanisms such as central processing unit (CPU) cores, graphics processing unit (GPU) cores, embedded processors, application specific integrated circuits (ASICs), and/or other computational mechanisms. Processor 402 also includes memory management unit (MMU) 422, which is a functional block that performs operations associated with address translations (e.g., page table walks, translation lookaside buffer lookups, etc.), memory access protections, etc. for memory accesses by cores 418-420. Processor 402 additionally includes advanced programmable interrupt controller (APIC) 430, which is a functional block that performs operations associated with the processing of interrupts in processor 402. APICs are known in the art and are therefore not described in detail. In some embodiments, APIC 430 is virtualized for guest operating systems and the functions emulated as known in the art or described herein.

Memory 404 is a functional block that performs operations of a memory in electronic device 400 (e.g., a "main" memory). Memory 404 includes memory circuits such as one or more of dynamic random access memory (DRAM), double data rate synchronous DRAM (DDR SDRAM), and/or other types of memory circuits for storing data and instructions for use by other functional blocks in electronic device 400, as well as control circuits for handling accesses (e.g., reads, writes, checks, deletes, invalidates, etc.) of the data and instructions that are stored in the memory circuits.

Mass storage 406 is a functional block and/or device that performs operations of a high-capacity non-volatile storage element for storing data and instructions for use by other functional blocks in electronic device 400. Mass storage 406 can be or include a high-capacity semiconductor memory (e.g., flash memory, etc.), a disk drive (hard drive, etc.), an optical drive, etc. Copies of the data and instructions stored in mass storage 406 are acquired and stored in memory 404 for use by other functional blocks in electronic device 400. For example, in some embodiments, data and/or instructions are retrieved from mass storage 406 in blocks or "pages" of a given size (e.g., 4 kB, 2 MB, etc.) and the pages are stored in memory 404 for accesses by the other functional blocks. In addition, pages may be newly created at an available location in memory 404 (e.g., for storing computational results, etc.).

IO devices 408-412 are functional blocks and/or devices that perform corresponding IO operations. The particular nature of the IO operations performed by each of IO devices 408-412 depend on the nature of the IO device. For example, IO devices 408-412 can include human interface devices, network interface devices, audio/visual processing or providing devices, GPUs, sensor devices, disk controllers, peripheral component interface (PCI) devices, universal serial bus (USB) devices, etc., and each IO device performs associated operations, such as receiving input from a human (e.g., keyboard, mouse, etc.), receiving or sending data on a network, etc. IO devices 408-412 provide data and/or instructions to, or consume data and/or instructions from, other functional blocks in electronic device 400. For example, in some embodiments, IO devices 408-412 access (i.e., read, write, invalidate, etc.) data in pages of memory in guest memory 428 (i.e., a portion of the memory reserved for a given guest operating system).

In some embodiments, IOMMU 424 monitors for operations initiated by IO devices 408-412, such as requests for direct memory accesses (DMAs) of memory 404, interrupts to cores 418-420, peripheral page requests, etc. Based on operations initiated by IO devices 408-412, IOMMU 424 may determine that an interrupt is to be signaled to a hypervisor and/or a guest operating system (e.g., to the appropriate drivers in the hypervisor and/or the guest operating system). For example, IOMMU 424 may encounter a fault translating a DMA address, may write a PPR log request, etc. and may determine that an interrupt is to be signaled to the hypervisor and/or the guest operating system. Some or all of these interrupts are processed using the operations described herein.

IO hub 414 is a functional block that performs operations of an input-output hub that interfaces between IO devices 408-412 and other functional blocks in electronic device 400 (e.g., processor 402, memory 404, etc.). The operations performed by IO hub 414 include operations for ensuring that communications destined for IO devices 408-412 reach the intended IO device, that communications from IO devices 408-412 properly reach other functional blocks, that the other functional blocks are kept secure from impermissible accesses by IO devices 408-412 and vice versa, etc. In some embodiments, IO hub 414 interfaces, and thus converts or translates associated communications, between buses that use different communication standards, such as between a peripheral component interface express (PCIe) bus and a HyperTransport Link®, etc.

IO hub 414 includes IOMMU 424, which is a functional block that performs operations for enabling IO devices 408-412 to access data and/or instructions in memory 404, communicates with processor 402 (and guest operating systems executed thereby), etc. In these embodiments, when data and instructions are to be accessed by an IO device (e.g., IO device 408) in memory 404, the IO device sends a memory access request (e.g., a direct memory access request or DMA) to IOMMU 424. IOMMU 424 then sends a corresponding request to memory 404 for satisfaction of the memory access request. For example, in some embodiments, if data is to be retrieved based on the memory access request, IOMMU 424 acquires the data from memory 404 (or mass storage 406, should the data not be present in memory 404) and forwards the data to the requesting IO device. In some embodiments, IOMMU 424 includes page tables, translation lookaside buffers, and/or other functional blocks that are used for translating "virtual," or local, memory addresses used by IO devices 408-412 into physical addresses in memory 404 where data is actually located. In addition, when another functional block and/or device in electronic device 400 is to access an IO device (e.g., to communicate with or retrieve data from the IO device), IOMMU 424 interfaces between the functional blocks and/or device to enable the access such as by forwarding communications, control values, data, etc.

In the described embodiments, IOMMU 424 communicates with guest operating systems executed by cores 418-420 in virtual machines and vice versa. For example, in some embodiments, IOMMU 424 (or IO devices 408-412 via IOMMU 424) communicates events and peripheral page requests (PPRs) to guest operating systems. In these embodiments, IOMMU 424 reports, to guest operating systems, events such as IO page faults (for page table walks on behalf of IO devices 408-412), IOMMU 424 hardware errors, etc., via shared guest event logs in memory 404. In addition, in these embodiments, IOMMU 424 forwards, to guest operating systems, PPRs from peripherals (IO devices) that use the well-known address translation service or ATS standard for memory page servicing operations (i.e., for performing operations on or associated with pages in memory 404 that are accessible by the guest operating system) via shared guest PPR logs in memory 404. As another example, in some embodiments, guest operating systems communicate commands to IOMMU 424. In these embodiments, guest operating systems issue commands to the IOMMU 424 to control the IOMMU 424 and/or IO devices 408-412 such as completion wait (which serves as a command barrier that forces earlier commands to complete before the IOMMU 424 proceeds), device table entry invalidations, IOMMU 424 translation lookaside buffer entry invalidations, etc. via shared guest command buffers in memory 404. As yet another example, IOMMU 424 communicates, to guest operating systems, information about IOMMU-sourced interrupts such as peripheral page request interrupts, event based interrupts, instruction completion based interrupts (e.g., completion wait interrupts, completion wait synchronization interrupts, etc.), etc. As described in more detail below, IOMMU 424 uses virtual APIC backing pages to communicate information about interrupts to guest operating systems.

In some embodiments, IOMMU 424 provides an interface to guest operating systems, the interface including memory-mapped locations, registers, etc. that are used for communicating with IOMMU 424. For example, in some embodiments, IOMMU 424 provides a set of memory mapped input-output (MMIO) memory locations to which guest operating systems can write values so that the values will be received by IOMMU 424. In some embodiments, the interface is virtualized, in that the memory locations, registers, etc. are not, as assumed by the guest operating system, used for storing the values, but instead are simply presented as such by IOMMU 424. In these embodiments, IOMMU 424 may receive values via the interface from guest operating systems (e.g., addressed to IOMMU MMIO addresses, etc.), but uses IOMMU backing store 426 and/or other locations in memory 404 for storing separate copies of the values in the memory locations, registers, etc. for each guest operating system. The memory accessed by IOMMU 424 for communicating with guest operating systems and other entities (e.g., processor 402, etc.) is described in more detail below.

In some embodiments, although not shown in FIG. 4, IOMMU 424 includes a local cache memory that is used for storing copies of data or information for IOMMU 424. For example, in some embodiments, the cache memory is used for storing copies of recently-used or often-used data from IOMMU backing store 426, such as sets of values for IOMMU MMIO registers for a given guest operating system and/or individual values therefrom. The cache memory is smaller than IOMMU backing store 426 and thus may only have capacity (i.e., memory locations) for storing a fraction (and likely a small fraction) of the data and information stored in IOMMU backing store 426.

Guest memory 428 is a portion of memory 404 (e.g., one or more contiguous or non-contiguous pages or blocks of memory) that is used by a corresponding guest operating system for storing data and information to be used by the guest operating system. Generally, guest memory 428 can be used by the guest operating system and/or other entities to store any form of data and information used by the guest operating system and/or other entities. In some embodiments, guest memory 428 is protected and only certain entities are permitted to access guest memory 428. For example, the corresponding guest operating system, the hypervisor, a security processor, and/or an operating system in electronic device 400 may "protect" guest memory 428 by limiting accesses of guest memory 428 to the corresponding guest operating system and specified other devices and/or functional blocks. In some embodiments, guest memory 428 is encrypted or otherwise rendered inaccessible by undesired entities. In some embodiments, guest memory 428 is used for storing guest event logs, guest peripheral page request (PPR) logs, and guest command buffers, which are data structures (e.g., tables, lists, etc.) that are used for communicating between the guest operating system and the IOMMU. In addition, in some embodiments, guest memory 428 is used for storing a virtual APIC backing page (e.g., one or more N-byte blocks of memory) that are used by a hypervisor and other entities to enable guest operating systems to receive and process/handle interrupts. Guest event logs, guest peripheral page request (PPR) logs, guest command buffers, and virtual APIC backing pages are described in more detail below.

Hypervisor memory 432 is a portion of memory (e.g., one or more contiguous or non-contiguous pages or blocks of memory) that is used by a hypervisor for storing data and information to be used by the hypervisor and/or other entities. Generally, hypervisor memory 432 can be used by the hypervisor and/or the other entities to store various forms of data and information to be used by the hypervisor and/or the other entities. For example, in some embodiments, hypervisor memory 432 includes data and/or information such as a device table, an interrupt remapping table, etc. Although hypervisor memory 432 is described as "hypervisor" memory, in some embodiments, hypervisor memory 432 is accessible to various other entities in the system—and simply includes memory regions or locations where data and/or information initialized by, maintained by, and/or accessed via the hypervisor are stored. In some embodiments, at least some of what is shown and described as hypervisor memory 432 is merely data and/or information that is stored in system memory and is freely readable and possibly freely writeable by the hypervisor and/or the other entities.

In some embodiments, communication paths are coupled between the various functional blocks in electronic device 400 (processor 402, memory controller 416, memory 404, etc.), as shown by arrow-headed lines between the elements. Communication paths include one or more buses, wires, guides, and/or other connections possibly along with controllers, fabric elements (switches, routers, etc.), circuit elements, etc. The communication paths are used to route commands, data, control signals, and/or other information between the functional blocks. For example, in some embodiments, a coherent bus fabric or interconnect is coupled between IO hub 414, processor 402 (e.g., MMU 422), and memory 404. Note that some communication paths in electronic device 400 are not shown in FIG. 4 for clarity.

In some embodiments, electronic device hardware 310 in FIG. 3 includes functional blocks and devices such as processor 402 and memory 404, and IO device hardware 314 includes functional blocks and devices such as IO devices 408-412. In these embodiments, IOMMU 312 in FIG. 3 and IOMMU 424 in FIG. 4 perform at least some of the same operations.

Electronic device 400 is shown using a particular number and arrangement of elements (e.g., functional blocks and devices such as processor 402, memory 404, etc.) and communication paths. Electronic device 400, however, is simplified for illustrative purposes, in some embodiments, a different number or arrangement of elements and/or communication paths is present in electronic device 400. For example, electronic device 400 can include power subsystems, displays, etc. Generally, electronic device 400 includes sufficient elements and communication paths to perform the operations herein described.

Electronic device 400 can be, or can be included in, any electronic device that performs computational operations. For example, electronic device 400 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

IOMMU-Sourced Interrupts

In the described embodiments, an IOMMU (e.g., IOMMU 424) performs operations for signaling IOMMU-sourced interrupts to guest operating systems. The interrupts signaled to the guest operating systems are "IOMMU-sourced" in that the interrupts are generated by the IOMMU. For example, the IOMMU may generate an interrupt in order to inform a guest operating system of an event that was encountered, performed by, or occurred in the IOMMU such as a fault or error, a guest operating system log or buffer write, etc. As another example, the IOMMU may generate an interrupt in order to inform the guest operating system of an operation initiated by an IO device and/or an error or fault that occurred while processing an operation initiated by an IO device. Generally, in the described embodiments, the IOMMU may signal any type of interrupt to a guest operating system using the described mechanisms (i.e., virtual APIC backing page, etc.). In other words, "IOMMU-sourced" interrupts can be or include any interrupt that can be communicated from an IOMMU to a guest operating system.

Portions of Memory Accessed by the IOMMU

Figure 5:
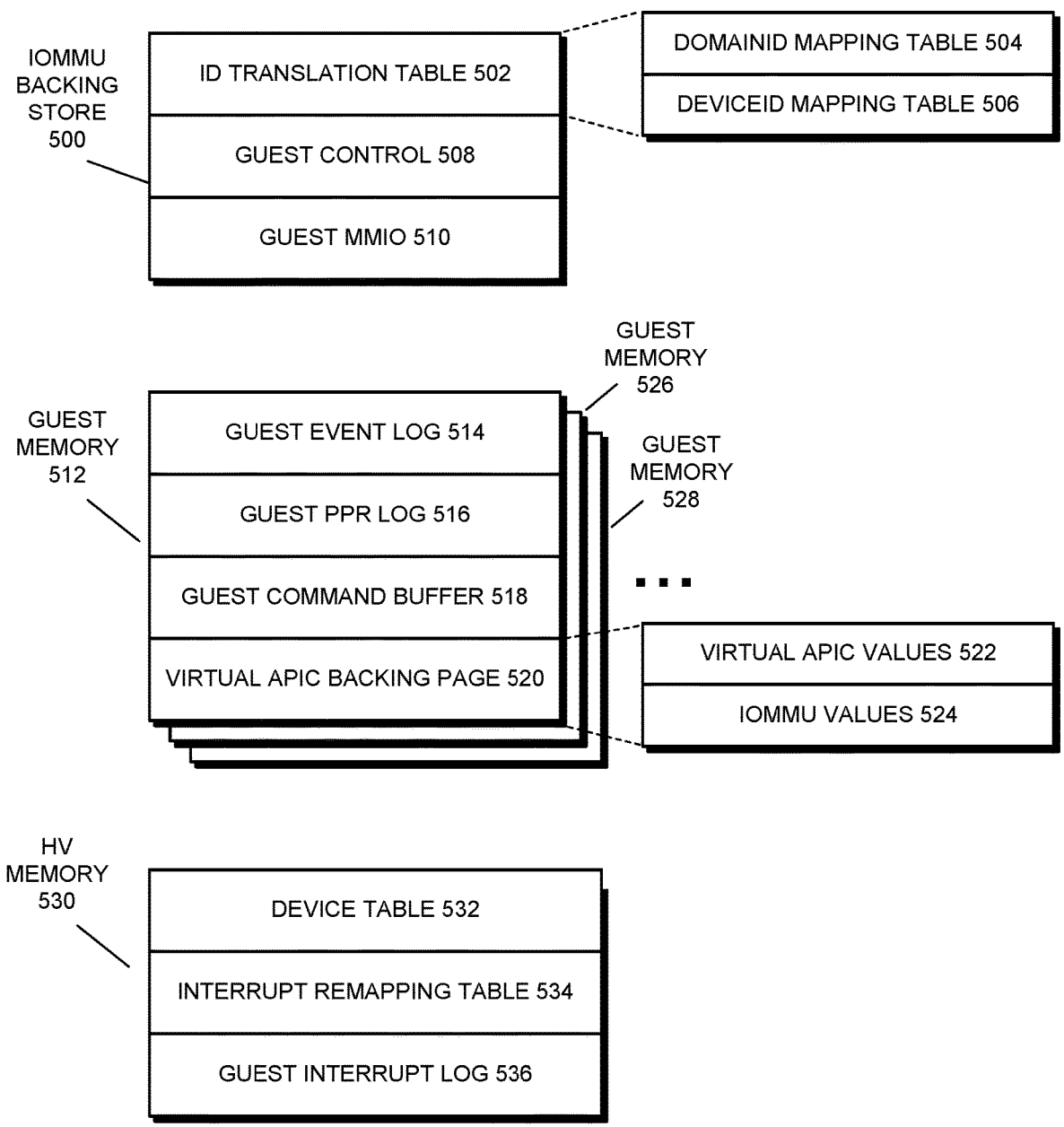
FIG. 5 presents a block diagram illustrating portions of memory accessed by an IOMMU in accordance with some embodiments.

In some embodiments, the IOMMU accesses data and information in different portions of memory (e.g., memory 404) in order to perform the operations herein described and other operations. In some of these embodiments, the portions of memory include an IOMMU backing store (e.g., IOMMU backing store 426), a guest memory (e.g., guest memory 428), and/or a hypervisor memory. FIG. 5 presents a block diagram illustrating portions of memory accessed by the IOMMU in accordance with some embodiments. Although FIG. 5 is presented as an example, in some embodiments, the memory and/or different portions of the memory store different types and/or arrangements of information. Generally, the memory includes sufficient information to enable the operations herein described.

As can be seen in FIG. 5, IOMMU backing store 500 includes ID translation table 502. Generally, ID translation table 502 includes information that is used by the IOMMU for translating or converting guest domainIDs and/or deviceIDs in communications from guest operating systems to the IOMMU to host domainID and/or deviceIDs—or the reverse, for communications from the IOMMU to the guest operating systems. DomainIDs and deviceIDs are described in more detail in the AMD I/O Virtualization Technology (IOMMU) Specification, rev. 3.00, December 2016, which, as described above, is incorporated by reference herein.

In some embodiments, ID translation table 502 includes separate tables for domainIDs, shown as domainID mapping table 504, and deviceIDs, shown as deviceID mapping table 506, although separate tables are not required (and thus all of the translations may be included in a single table). DomainID mapping table 504 includes a set of entries, each entry used for storing an identification or indication of a guest domainID that is associated with or related to a specified host domainID. DeviceID mapping table 506 includes a set of entries, each entry used for storing an identification or indication of a guest deviceID that is associated with or related to a specified host deviceID. In operation, when a guest or host domainID and/or deviceID is to be translated or converted in a communication, the IOMMU performs a lookup in ID translation table 502 (i.e., domainID mapping table 504 and/or deviceID mapping table 506) to acquire the corresponding translation or conversion.

IOMMU backing store 500 also includes guest control 508. Generally, guest control 508 includes copies of values stored in or from interface registers and control registers for guest operating systems in the electronic device. Guest control 508 includes, for each supported guest operating system, a copy of guest interface registers and/or guest operating system control registers (or at least the values therein) that control interactions between the IOMMU and that guest operating system. For example, guest control 508 may include, for each guest operating system, map control registers that are used for communicating domainID and/or deviceID mappings for the guest operating system to the IOMMU.

IOMMU backing store 500 further includes guest memory mapped input-output (MMIO) 510. Generally, guest MMIO 510 includes pointer and control information used for accessing buffers and logs (e.g., guest command buffers, guest event logs, and guest PPR logs) for guest operating systems in guest portions of memory 404 (e.g., guest memory 428). More specifically, guest MMIO 510 includes, for each supported guest operating system, a copy of values that are used for controlling accesses of buffers and logs in the guest portions of memory 404. For example, in some embodiments, the IOMMU supports (can interact with, process communications for, etc.) $2^N$ guest operating systems, where N=10, 16, or another value, and thus guest MMIO 510 includes up to $2^N$ copies of the values, one for each supported guest operating system. In the described embodiments, the values that are used for controlling accesses are similar to the values stored in IOMMU MMIO registers in existing devices, although a separate set of the values is kept for each supported guest operating system— and refers to that guest operating system's guest portion of memory 404 (and not the single copy in the IOMMU in existing devices).

Figure 6:
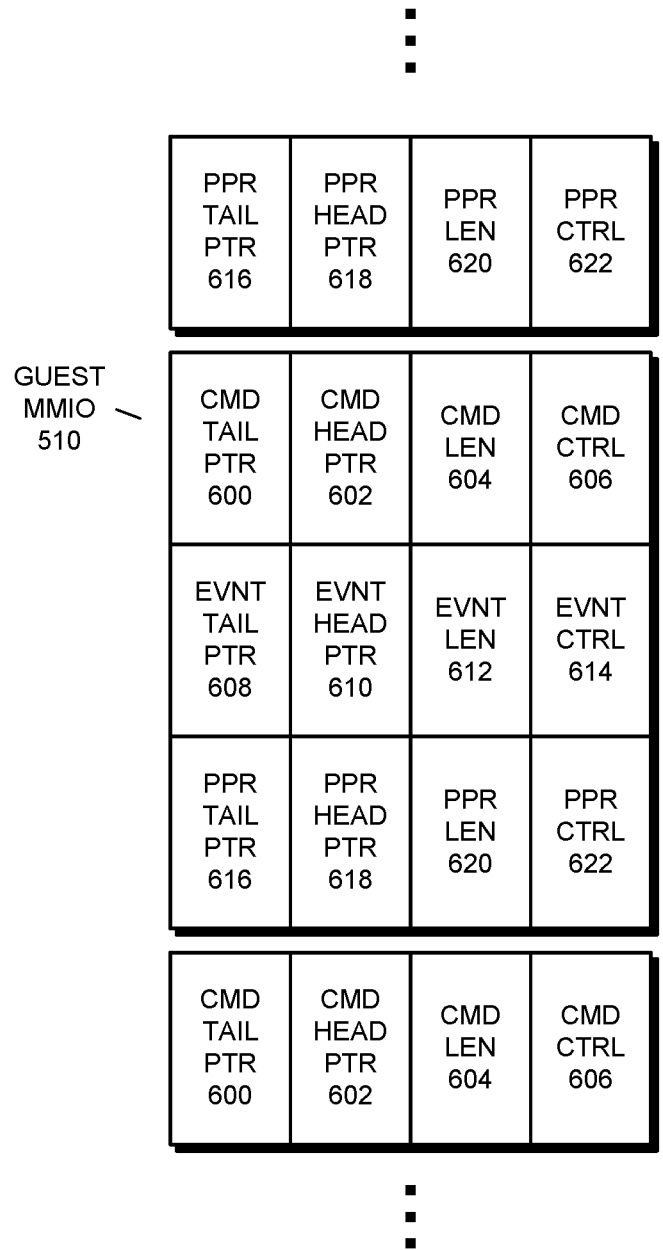
FIG. 6 presents a block diagram illustrating values stored in a guest copy of IOMMU MMIO registers in accordance with some embodiments.

FIG. 6 presents a block diagram illustrating values stored in guest MMIO 510 in accordance with some embodiments. For the example in FIG. 6, values are shown for a single complete set of IOMMU MMIO registers for a given guest operating system along with values for parts of two neighboring sets of IOMMU MMIO registers above and below the single complete set of values. FIG. 6 is shown in this way to illustrate that, as described above, in some embodiments, IOMMU backing store 426 includes multiple separate sets of values, each set of values associated with a given guest operating system. Although FIG. 6 is presented as an example, in some embodiments, guest MMIO 510 stores different or differently-arranged values. Generally, guest MMIO 510 and/or another entity stores sufficient information to access buffers and logs in guest portions of memory as herein described.

The values in each set of values in guest MMIO 510 can generally be grouped into values associated with a guest command (CMD) buffer, a guest event log, and a guest PPR log for a guest operating system. For the guest command buffer, the values include command tail pointer 600, which is a pointer or other reference that indicates an end, tail, or most-recently written entry of the guest command buffer in the corresponding guest portion of memory 404. In other words, command tail pointer 600 holds a pointer or reference such as a memory address, e.g., some or all of the bits of a physical address in the guest portion of memory 404, that indicates where the tail or a most recently written entry of the command buffer is located. The values for the guest command buffer also include command head pointer 602, which is a pointer or other reference that indicates a head or base of the command buffer, i.e., a location where the command buffer starts and/or the buffered commands start in the corresponding guest portion of memory 404. The values for the guest command buffer further include command length 604, which is a value that indicates the current size or maximum size of the command buffer, such as the number of entries or bytes. The values for guest command buffer further include command control 606, which is set or sequence of bits that includes a number of bits (or combinations thereof) that indicate the configuration of the guest operating system and/or the command buffer in the corresponding guest portion of memory 404. For example, in some embodiments, command control 606 includes bits that indicate whether certain command-buffer-related interrupts are enabled, whether command buffering or processing is enabled (or disabled/halted), what types of commands are or are allowed to be present in the command buffer, etc. For instance, in some embodiments, command control 606 includes control values for the command buffer similar to those described in the AMD I/O Virtualization Technology (IOMMU) Specification, rev. 3.00, which is, as described above, incorporated by reference herein—such as CmdWaitInt, CmdBufRun, CmdWaitInteEn, CmdBufEn, and/or other values.

For the event log, the values in guest MMIO 510, i.e., event tail pointer 608, event head pointer 610, event length 612, and event control 614 are similar in function to those described above for the command buffer, although the values are used for accesses to the event log in the corresponding guest portion of memory 404. The same is true for the PPR log, in that the values in guest MMIO 510, i.e., PPR tail pointer 616, PPR head pointer 618, PPR length 620, and PPR control 622, similar in function to those described above for the command buffer, although the values are used for accesses to the PPR log in the corresponding guest portion of memory 404.

In some embodiments, fewer than the supported number of guest operating systems (and possibly far fewer) may be executing in electronic device 400 at any given time. In some of these embodiments, IOMMU backing store 500 is dynamically adjusted to include sufficient space for storing guest MMIO 510, etc. In other words, as guest operating systems are initialized/active, the hypervisor and/or another entity can allocate, append, or activate space in IOMMU backing store 500 (i.e., in guest MMIO 510) for storing the IOMMU MMIO register values for the guest operating system. In some of these embodiments, IOMMU backing store 500 does not have additional empty/unused space allocated for virtual machines that do not yet exist (i.e., have not been initialized) in electronic device 400.

In some embodiments, the hypervisor performs at least some initialization operations for IOMMU backing store 500. For example, in some embodiments, the hypervisor allocates memory, e.g., contiguous or scattered pages of memory, in memory 404 for storing the IOMMU backing store. As described above, memory 404 is a general-purpose memory in electronic device 400 that is used by various functional blocks (e.g., cores 418-420, etc.) for storing data and information—and is not simply a local memory in the IOMMU. This operation therefore involves the hypervisor allocating space in the "main" memory of electronic device 400 for storing the IOMMU backing store. As another example, in some embodiments, the hypervisor, via the IOMMU, writes initial values into the copies of the IOMMU MMIO registers in the backing store for each active guest operating system. The hypervisor therefore writes the initial values of the pointers and the control values for each active guest operating system in the respective copy of the IOMMU MMIO registers in the IOMMU backing store, such as when the guest operating system starts up.

In some embodiments, only a subset of available IOMMU MMIO registers are included in the copies of the IOMMU MMIO registers in the IOMMU backing store. In these embodiments, other registers may be provided by the IOMMU itself. For example, in some embodiments, registers in the IOMMU that store IOMMU control values (e.g., IOMMU enable/disable, etc.), page table base addresses, etc. are provided by the IOMMU. Generally, IOMMU MMIO registers that are not used for accessing the buffers and logs in portions of the memory for guest operating systems are not presented as copies, but instead a single copy of each register is provided by the IOMMU. In some of these embodiments, the hypervisor emulates these IOMMU registers for guest operating systems, but accesses are received by and handled in the IOMMU for registers in the IOMMU.

Returning to FIG. 5, guest memory 512 includes guest event log 514, guest peripheral page request (PPR) log 516, guest command buffer 518, and virtual APIC backing page 520 for a guest operating system. Generally, guest event log 514, guest PPR log 516, guest command buffer 518, and virtual APIC backing page 520 are structures in memory (e.g., lists, tables, buffers, etc.) that are used for storing corresponding events, PPR requests, commands, and information about and/or for processing or handling interrupts for access by the IOMMU and/or the guest operating system. For example, guest event log 514 may be a table or a ring buffer that includes a number of entries (e.g., 24, 50, etc.) each entry for holding information (e.g., a pattern of bits) representing a particular event that occurred in the IOMMU that is to be processed by the corresponding guest operating system. As another example, virtual APIC backing page may be a table or listing in memory that includes values for registers or memory locations in a virtualized copy of an APIC and values provided by the IOMMU for IOMMU-sourced interrupts. In operation, the IOMMU communicates, to the guest operating system, events and PPRs via the corresponding log in guest event logs 514 and guest PPR logs 516 in guest memory 512. In addition, the guest operating system communicates, to the IOMMU, commands via the corresponding command buffer in guest command buffers 518 in guest memory 512. The IOMMU and/or other entities also communicate information about interrupts to the guest operating system via virtual APIC backing page 520.

As can be seen in FIG. 5, virtual APIC backing page 520 includes virtual APIC values 522, which include values for emulating a virtualized APIC for the corresponding guest operating system, such as values for the interrupt command register (ICR), interrupt request register (IRR), in-service register (ISR), the end of interrupt (EOI), etc. These values and the functions associated therewith are known in the art and are described in, for example, in the AMD64 Architecture Programmer's Manual Volume 2: System Programming, rev. 3.30, September 2018, which, as described above, is incorporated by reference herein.

Virtual APIC backing page 520 also includes IOMMU values 524, which are values used by the IOMMU for communicating information about IOMMU-sourced interrupts to the corresponding guest operating system—and are not present in existing electronic devices. In some embodiments, IOMMU values 524 include a separate value that is used to communicate information about each permissible type of IOMMU-sourced interrupt to the corresponding guest operating system. In these embodiments, therefore, if there are N types of IOMMU-sourced interrupts, there will be N values in IOMMU values 524. In some embodiments, IOMMU values 524 include a single value that is used for communicating information about all types of IOMMU-sourced interrupts to the corresponding guest operating system. Generally, the information in IOMMU values 524 is sufficient to communicate, to the corresponding guest operating system, the type, parameters, and/or other properties of the respective IOMMU-sourced interrupt. For example, in some embodiments, each IOMMU-sourced interrupt may be characterized or represented by multi-bit values that include one or more interrupt identifiers, one or more source/destination identifiers, one or more control values, one or more target values, and/or other values.

Although certain values are shown in virtual APIC backing page 520, in some embodiments, virtual APIC backing page 520 includes different and/or differently-arranged values. Virtual APIC backing page 520 generally includes sufficient values to perform the operations herein described.

In some embodiments, each guest operating system active in electronic device 400 is associated with a corresponding separate guest portion of the memory (i.e., a number of pages in memory 404) that includes a guest event log, a peripheral page request log, a guest command buffer, and a virtual APIC backing page used by that guest operating system and accessible by the IOMMU. This is shown in FIG. 5 as additional guest memories 526-528 behind guest memory 512.

Hypervisor memory 530 includes device table 532, interrupt remapping table 534, and guest interrupt log 536. Device table 532 is a table in which device-related information is stored for devices (which can be actual/physical devices or virtual devices) in, associated with, and/or coupled to the electronic device. Device table 532 includes a set of entries, each entry useable to store information about a corresponding device, such as pointers to page tables and interrupt remapping tables, control and configuration values, capability indicators, mode indicators, domainID, security information and settings, etc. In addition, in the described embodiments—and differently than in existing device tables—each entry in device table 532 includes deviceID and a guest identifier for a guest operating system in communication with, responsible for, or otherwise associated with the device. In operation, in addition to using the device table for determining information about devices, the IOMMU uses the deviceIDs and/or guest identifiers for translating or converting guest deviceIDs to host deviceIDs. The IOMMU also uses an interrupt remapping table root pointer in a device table entry associated with the IOMMU to determine a location in memory (e.g., an address and/or offset) where interrupt remapping table 534 is stored.

Interrupt remapping table 534 is a table associated with the IOMMU that includes a number of entries that are used for storing identifiers (e.g., addresses, pointers, offsets, and/or other references) to locations in memory where information about interrupts is to be written for various entities in electronic device 400. For example, in some embodiments, interrupt remapping table 534 includes identifiers of locations in virtual APIC backing pages for guest operating systems in respective guest portions of the memory into which interrupt information is to be written for one or more types of IOMMU-sourced interrupts. When signaling an interrupt to a given guest operating system, the IOMMU performs a lookup in the interrupt remapping table to determine a location in a virtual APIC backing page in a corresponding guest portion of the memory where the information about the interrupt is to be written.

Guest interrupt log 536 is a table, buffer, and/or other structure that is used by the IOMMU (and possibly other entities) for storing information about interrupts that are destined for guest operating systems. When an IOMMU-sourced interrupt destined for a given guest operating system is unable to be directly communicated to a given guest operating system using a virtual APIC backing page as described herein, the IOMMU writes information about the interrupt to guest interrupt log 536 and signals the hypervisor that the interrupt is awaiting processing by the given guest operating system. The hypervisor then acquires the information about the interrupt from guest interrupt log 536 and interacts with the given guest operating system to enable the given guest operating system to process the interrupt.

In some embodiments, guest operating systems are configured or designed to support receiving IOMMU-sourced interrupts from the IOMMU via corresponding virtual APIC backing pages as described herein. For example, guest operating systems may include program code, routines, methods, and/or other mechanisms for receiving IOMMU-sourced interrupts from the IOMMU (and other guest operating systems may not). As another example, guest operating systems may include one or more software switches or control values that configure the guest operating systems to receive (or not) IOMMU-sourced interrupts from the IOMMU. In these embodiments, each guest operating system is associated with one or more configuration indicators (e.g., bits, bytes, etc.) that indicate whether the guest operating system can receive interrupts from the IOMMU via the corresponding virtual APIC backing page. As yet another example, the electronic device, hypervisor, and/or another entity in electronic device may disable the direct communication of information about interrupts from the IOMMU to one or more (and possibly all) guest operating systems. When the IOMMU is unable to send IOMMU-sourced interrupts to guest operating systems via the corresponding virtual APIC backing page for one or more of these reasons, the IOMMU uses the guest interrupt log 536 as described above for communicating the interrupt to the given guest operating system.

In some embodiments, some or all of the IOMMU backing store 500, guest memory 512, and hypervisor memory 530 and/or portions thereof are not contiguous, but instead are stored in different areas or locations of memory. For example, a base address of the guest event log 514 (and thus the guest event log itself) may be located remote in memory from the guest PPR log 516. Guest event log 514 may not, therefore, neighbor guest PPR log 516 as shown in FIG. 5.

In some embodiments, the IOMMU includes a private address map that includes pointers to, references, and/or other indications of the locations in memory of the various data and information in the memory to be accessed by the IOMMU. For example, in some embodiments, the IOMMU private address map includes pointers or references to individual copies of IOMMU MMIO registers for guest operating systems and/or starting points/base addresses for sets of copies of IOMMU MMIO registers in IOMMU backing store 500. In these embodiments, before accessing data and information in memory, the IOMMU performs a lookup in the private address map for the location of the data and information.

In some embodiments, IOMMU backing store 500 and/or portions thereof (control bits, etc.) are accessed by other entities in electronic device 400 via the IOMMU (e.g., by sending a request to the IOMMU) or are inaccessible by other entities. For example, at least some of the data and information in IOMMU backing store 500 may be accessed by other entities via writes to and reads from corresponding IOMMU MMIO registers.

IOMMU and Guest Operating System Communications

Figure 7:
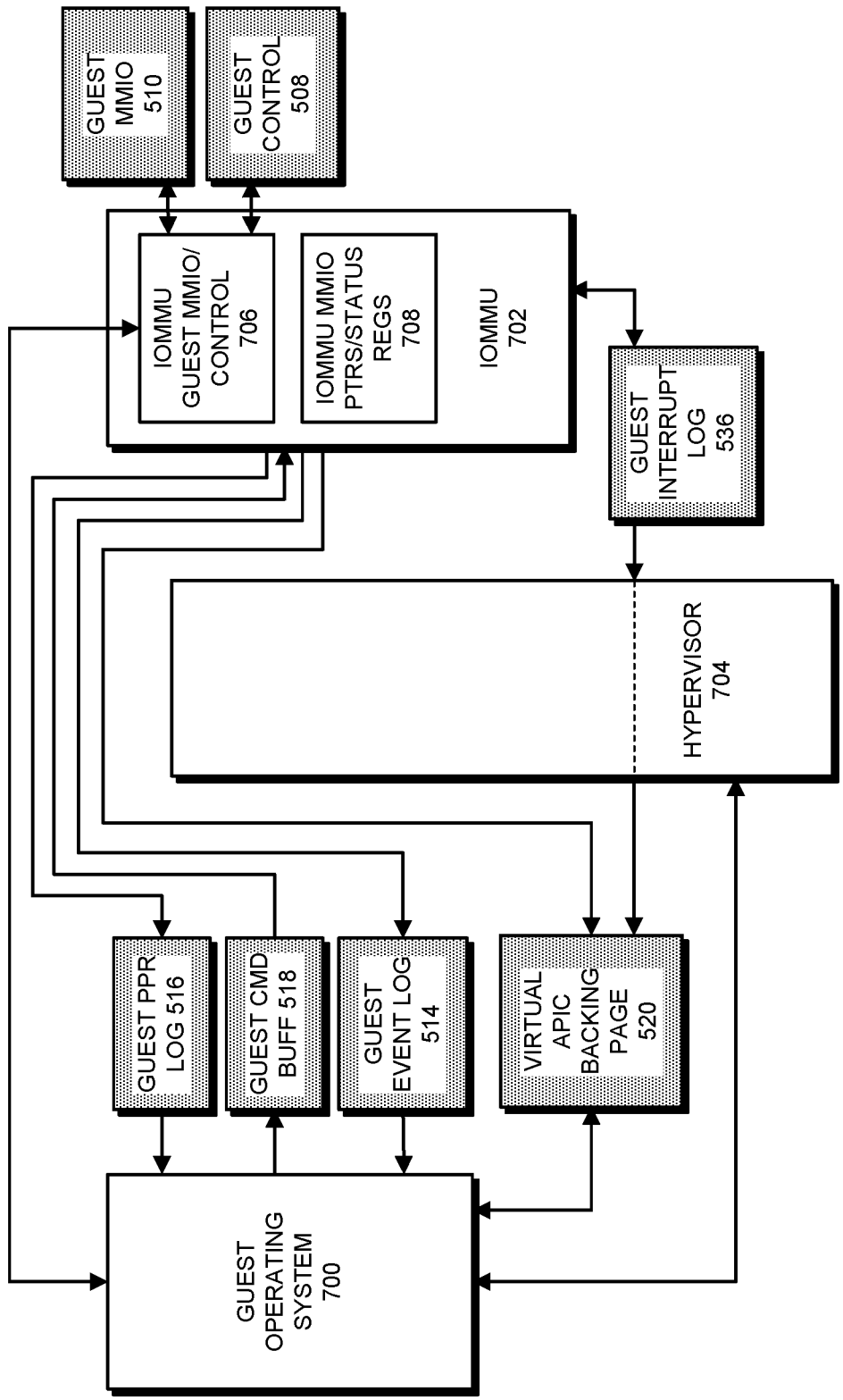
FIG. 7 presents a block diagram illustrating communications between a guest operating system and an IOMMU that are handled by the IOMMU in accordance with some embodiments.

In the described embodiments, an IOMMU (e.g., IOMMU 424) handles communications between the IOMMU (or IO devices serviced thereby) and guest operating systems. FIG. 7 presents a block diagram illustrating communications between a guest operating system 700 and an IOMMU 702 that are handled by IOMMU 702 in accordance with some embodiments. Although a number of elements are shown in a particular arrangement in FIG. 7, other embodiments use different numbers or arrangements of elements. Generally, in the described embodiments, IOMMU 702 includes or accesses sufficient elements to enable the operations herein described. In FIG. 7, a number of elements are shown dotted/stippled; these elements are logs, buffers, etc. that are stored in a memory (e.g., in IOMMU backing store 500, in guest memory 512, etc.) and accessed by IOMMU 702, guest operating system 700, and/or other entities using typical memory-access techniques. In some embodiments, guest operating system 700, IOMMU 702, and hypervisor 704 are organized similarly to guest operating system 302, IOMMU 312, and hypervisor 306 in FIG. 3, although this is not a requirement.

Figure 2:
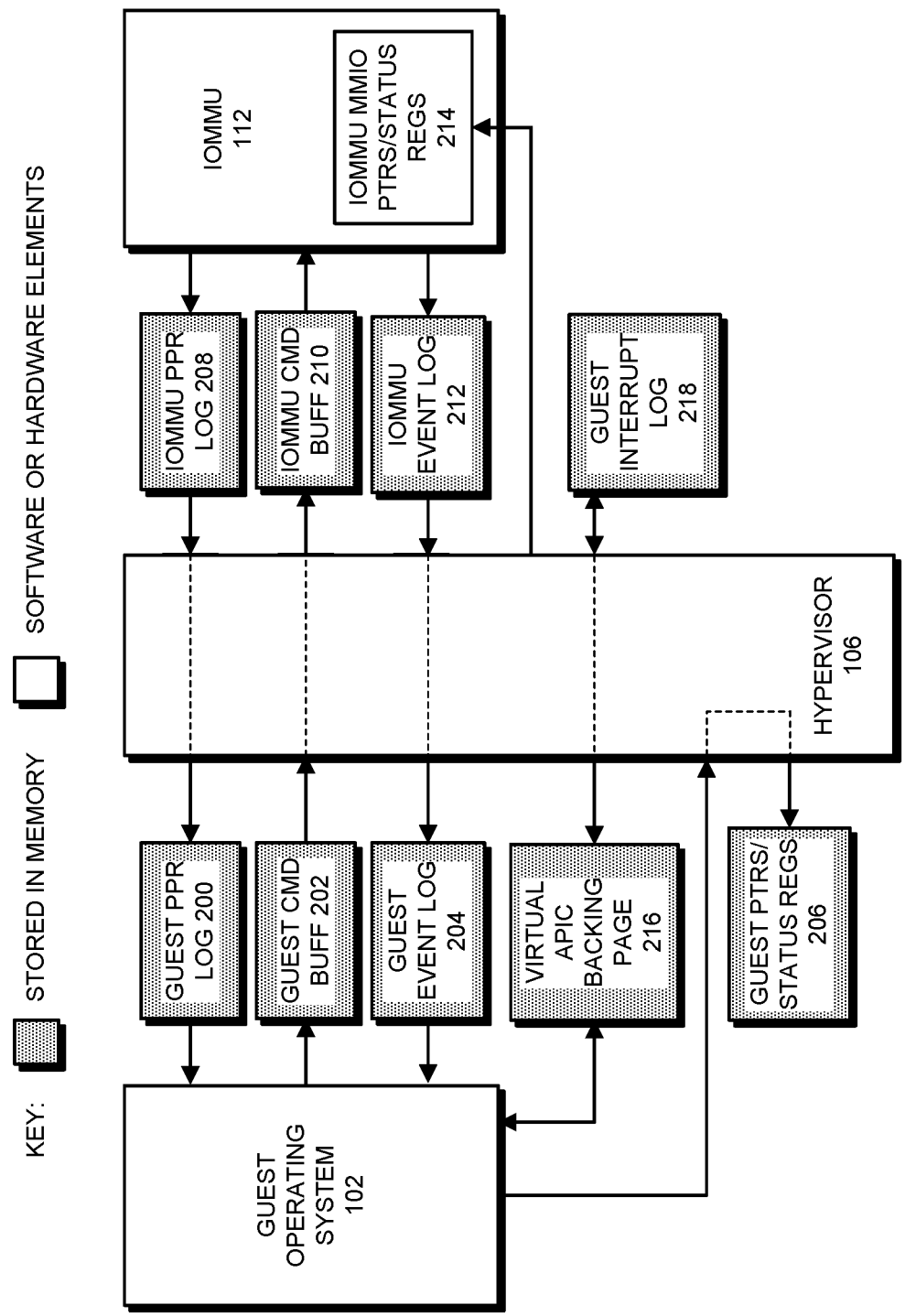
FIG. 2 presents a block diagram illustrating communications between a guest operating system and an IOMMU that are handled by the hypervisor.

As can be seen in FIG. 7, and differently than what is shown in FIG. 2 for existing systems, in the described embodiments, IOMMU 702 and guest operating system 700 communicate more directly with one another. In other words, IOMMU 702 and guest operating system 700 communicate with one another via guest event log 514, guest PPR log 516, guest command buffer (BUFF) 518, and virtual APIC backing page 520 in memory—i.e., in a guest portion of memory (e.g., guest memory 428) for guest operating system 700. In addition, guest operating system 700 and IOMMU 702 use guest control 508 and guest MMIO 510 to dictate, via IOMMU guest memory mapped input-output (MMIO)/control 706, how communications are to be performed. For example, in some embodiments, IOMMU 702 uses pointers in guest MMIO 510 to determine the locations in memory of guest event log 514, guest command buffer 518, and guest PPR log 516 for guest operating system 700. IOMMU also uses an interrupt remapping table (e.g., interrupt remapping table 534) to determine locations in virtual APIC backing page 520 in memory into which information about IOMMU-sourced interrupts is to be written. Hypervisor 704 does not intervene and is otherwise not involved in some or all of the operations for completing these communications. For example, hypervisor 704 does not perform operations such as translating domainIDs and deviceIDs for these communications, accessing the pointers in guest MMIO 510, communicating specified IOMMU-sourced interrupts to guest operating systems, and/or accessing the buffers and logs in the guest portion of the memory. Instead, IOMMU 702 performs these operations. Because IOMMU 702 translates the domainIDs and deviceIDs, accesses guest buffers and logs, communicates specified IOMMU-sourced interrupts to the guest operating system, etc., the described embodiments avoid using hypervisor 704 for processing at least part of communications between guest operating system 700 and IOMMU 702, which can mean that the communications complete more quickly, result in less load on processor 402 and memory 404, etc. Note however, that, similarly to what is shown in FIG. 2 (i.e., IOMMU memory mapped input-output pointers/status registers 214), IOMMU 702 includes a set of IOMMU memory mapped input-output pointers (PTRS)/status registers (REGS) 708, which are a set of registers in IOMMU 702 for storing pointers to various IOMMU 702 structures and status information associated with the IOMMU 702.

In operation, using a command as an example, guest operating system 700 writes an invalidate_IOMMU_pages command to guest command buffer 518. The command, when processed by IOMMU 702, causes IOMMU 702 to invalidate a range of entries in an IOMMU translation cache as specified by a domainID in the command. In other words, the guest operating system performs a memory write in a corresponding guest portion of the memory to update the next open/available entry in guest command buffer 518 to include information (i.e., bits representing the command) for the invalidate_IOMMU_pages command. Guest operating system 700 then sends a write command to the IOMMU to update (e.g., advance, etc.) a command buffer tail pointer (e.g., command tail pointer 600) in the corresponding IOMMU MMIO register to indicate that guest operating system 700 wrote the command to the command buffer. IOMMU 702 detects guest operating system 700's write of the command buffer tail pointer, e.g., via snooping the write to an address in the corresponding guest command buffer, detecting a change in the value of a buffer tail pointer, receiving the write command from guest operating system 700, etc. Upon detecting the write of the command buffer tail pointer, IOMMU 702 uses the value of the command buffer tail pointer to retrieve the command from the command buffer in the guest portion of the memory and prepares the command for processing (e.g., replacing a host domainID that is associated with a guest domainID in the command, etc.). IOMMU 702 then processes the command, causing IOMMU 702 to invalidate the range of entries in IOMMU 702's translation cache indicated by the host domainID. IOMMU 702 performs at least some similar operations for IOMMU 702 writes to guest PPR logs 516 and to guest event logs 514, albeit in reverse, as IOMMU 702 typically writes these logs and guest operating system 700 reads the logs.

In operation, IOMMU 702 encounters or experiences a condition causing an IOMMU-sourced interrupt that is to be processed or handled by guest operating system 700. IOMMU 702 then performs a lookup in an interrupt remapping table to determine a location in virtual APIC backing page 520 where information about the interrupt is to be written. IOMMU 702 next writes information about the interrupt to the location in virtual APIC backing page 520 and communicates an indication of the interrupt to guest operating system 700. Guest operating system 700 then acquires the information about the interrupt from the location in virtual APIC backing page 520 and uses the information about the interrupt to process or handle the interrupt.

In some embodiments, when guest operating system 700 is unable to receive information about interrupts directly from IOMMU 702, i.e., via virtual APIC backing page 520 as described herein, IOMMU 702 uses guest interrupt log 536 to communicate the information about the interrupts to guest operating system 700 via hypervisor 704. For example, guest operating system 700 may be unable to receive interrupts from IOMMU 702 via virtual APIC backing page 520 or may be configured, for security reasons, etc., not to receive interrupts from IOMMU 702. In some embodiments, IOMMU 702 preferentially uses virtual APIC backing page 520 to communicate information about interrupts directly to guest operating system 700 and only uses guest interrupt log 536/hypervisor 704 as a secondary/fallback option.

Although hypervisor 704 is not involved in certain parts of communications between guest operating system 700 and IOMMU 702, e.g., the translation of the guest domainID to the host domainID, hypervisor 704 and guest operating system 700 and/or IOMMU 702 may separately exchange communications associated with communications between guest operating system 700 and IOMMU 702 or hypervisor 704 may otherwise be involved in ensuring that the communications are properly handled by guest operating system 700 and/or IOMMU 702. As described above, hypervisor 704 may also initialize or update the IOMMU backing store, interrupt remapping table, etc.

Process for Signaling Interrupts from an IOMMU to a Guest Operating System

Figure 8:
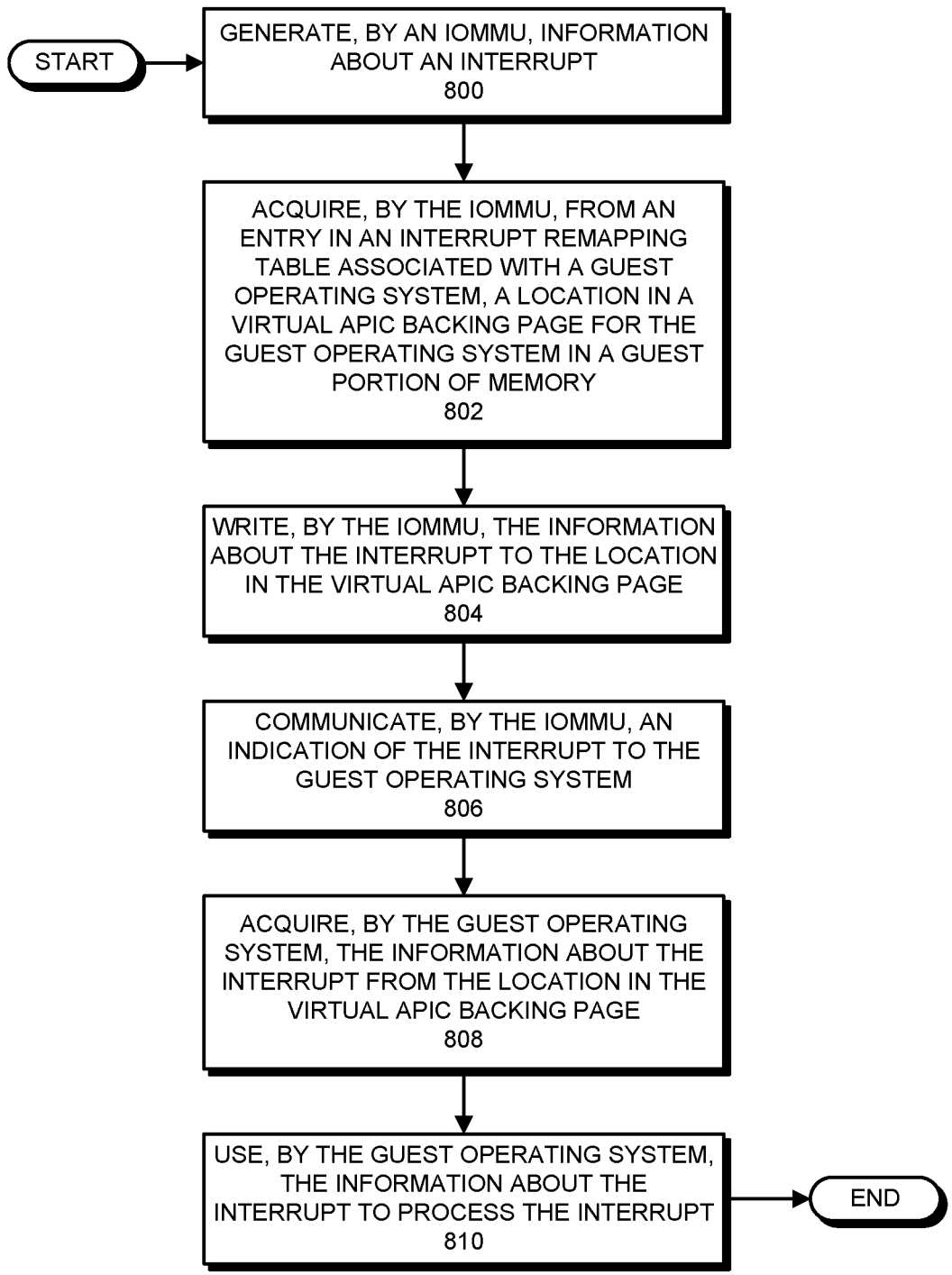
FIG. 8 presents a flowchart illustrating a process during which an IOMMU signals an interrupt to a guest operating system in accordance with some embodiments.

In the described embodiments, an IOMMU (e.g., IOMMU 702) performs operations for signaling interrupts to guest operating systems (e.g., guest operating system 700). For example, in some embodiments, the IOMMU signals, to guest operating systems, IOMMU-sourced interrupts such as interrupts generated in the IOMMU or based on interrupts from IO devices. The IOMMU signals the interrupts to guest operating systems "directly," in that the IOMMU itself writes information about the interrupts to specified locations in virtual APIC backing pages in each guest operating system's portion of the memory using typical memory access operations—without a hypervisor participating in or processing the memory access operations. The IOMMU then communicates an indication of the interrupt to the guest operating system in order to cause the guest operating system to process or handle the interrupt. FIG. 8 presents a flowchart illustrating a process during which an IOMMU signals an interrupt to a guest operating system in accordance with some embodiments. Note that the operations shown in FIG. 8 are presented as a general example of operations performed by some embodiments. The operations performed by other embodiments include different operations, operations that are performed in a different order, and/or operations that are performed by different entities or functional blocks.

The operations in FIG. 8 start when the IOMMU generates information about an interrupt (step 800). For this operation, the IOMMU either internally generates information about an interrupt, such as by detecting a specified event, error, etc. in the IOMMU and creating corresponding information, or receiving an indication of an interrupt, event, error, etc. from an IO device (or other entity) and creating corresponding information about the interrupt. For example, the IOMMU itself may write data to a buffer or log associated with the guest operating system and then generate information about an interrupt that will be communicated to the guest operating system to inform the guest operating system that the data in the buffer or log is to be processed or handled.

The particular format of the information about the interrupt generated by the IOMMU depends on the format of the interrupt itself, the configuration of the guest operating system, etc. For example, in some embodiments, the information about the interrupt includes specified information and/or is formatted in accordance with a message signaled interrupt (MSI) standard or protocol. Generally, the information includes at least an identification or representation of the interrupt and may include other properties and/or characteristics of the interrupt, the IOMMU, the IO device, the event or error that led to the interrupt, etc.

Figure 9:
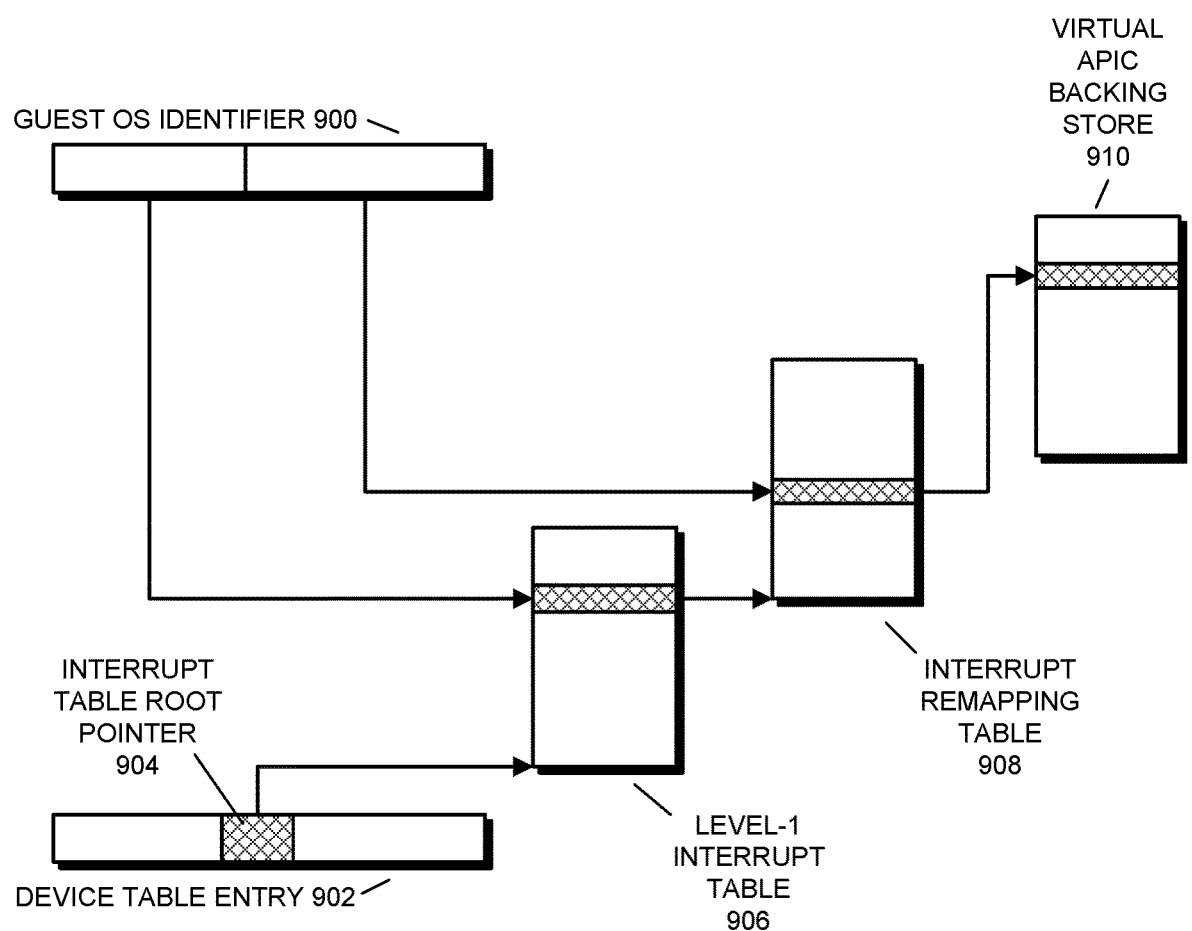
FIG. 9 presents a block diagram illustrating a lookup in an interrupt remapping table in accordance with some embodiments.

The IOMMU then acquires, from an entry in an interrupt remapping table associated with a guest operating system, a location in a virtual APIC backing page for the guest operating system in a guest portion of memory (step 802). Recall that the virtual APIC backing page is a portion of memory that is used for storing information about interrupts to be processed by the guest operating system and for otherwise virtualizing/emulating an APIC in electronic device 400. The virtual APIC backing page includes one or more locations (e.g., entries, portions, etc.) that are used for storing information about IOMMU-sourced interrupts for processing or handling by the guest operating system. For the operation in step 802, in some embodiments, the IOMMU uses a guest operating system identifier (ID) such as a system device identifier assigned to the guest operating system at initialization (e.g., by system hardware, an operating system, etc.) to perform a lookup in the interrupt remapping table. FIG. 9 presents a block diagram illustrating a lookup in an interrupt remapping table in accordance with some embodiments. Although a particular arrangement of the interrupt remapping table and operations are shown in FIG. 9, in some embodiments, other arrangements of remapping table and/or operations are used. Generally, in the described embodiments, the IOMMU determines, using the interrupt remapping table, a location where information about the interrupt is to be written in the virtual APIC backing page for the guest operating system.

For the embodiment shown in FIG. 9, the interrupt remapping table is divided into a hierarchy of sub-tables including level-one (LEVEL-1) interrupt remapping table 906 and interrupt remapping table 908. The division of the interrupt remapping table into the hierarchy of sub-tables can enable the interrupt remapping table to be more efficiently searched, stored in memory, operated on, etc. Although this arrangement of the interrupt remapping table is presented as an example, in some embodiments, the interrupt remapping table includes a more sub-tables or is implemented as a single table. Generally, the interrupt remapping table includes sufficient information to enable the operations herein described.

For the lookup in the interrupt remapping table, the IOMMU uses a first portion of guest operating system identifier 900 (e.g., a first N bits of an M bit guest operating system identifier 900, with N<M) and interrupt table root pointer 904 acquired from a device table entry 902 for the IOMMU to determine a particular entry in level-one interrupt table 906. The entry in level-one interrupt table 906 stores a root/base pointer for interrupt remapping table 908. The IOMMU uses the root/base pointer and a second portion of guest operating system identifier 900 (e.g., as an offset or reference) to determine an entry in interrupt remapping table 908. From the entry in interrupt remapping table 908, the IOMMU retrieves an identifier (e.g., an address, an offset, etc.) for a location in virtual APIC backing page 910 into which the information about the interrupt is to be stored.

In some embodiments, the IOMMU is able to communicate information about two or more different types of interrupts to guest operating systems. For example, in some embodiments, types of interrupts include event-notification interrupts, peripheral page request interrupts, fault or error interrupts, etc. In these embodiments, the virtual APIC backing page for each guest operating system includes two or more locations for IOMMU-sourced interrupts, each location used for storing information about one or more different types of interrupts. For the above-described lookup in the interrupt remapping table, in addition to the guest operating system identifier, the IOMMU can use a type indicator (e.g., one or more bits, etc.) in order to access corresponding entries in the remapping table for a given interrupt type.

Returning to FIG. 8, after acquiring the location in the virtual APIC backing page (step 802), the IOMMU writes the information about the interrupt to the location in the virtual APIC backing page (step 804). For this operation, the IOMMU writes at least an identifier for the interrupt to the location in the virtual APIC backing page and may write additional information about one or more properties or characteristics of the interrupt, the IOMMU and/or IO device, etc. For example, in some embodiments, the location in the virtual APIC backing page includes only a single bit that is set to indicate that the interrupt has occurred and thus the guest operating system should process or handle the interrupt, e.g., by executing specified interrupt handling program code, performing one or more operations, etc. As another example, in some embodiments, the location in the virtual APIC backing page includes multiple bits or bytes that can be used to store information identifying the interrupt along with other information about the properties and characteristics of the interrupt. In these embodiments, the guest operating system will retrieve the information about the interrupt from the virtual APIC backing page and use the information about the interrupt to process or handle the interrupt.

The IOMMU next communicates, to the guest operating system, an indication of the interrupt (step 806). For this operation, the IOMMU informs the guest operating system that the interrupt is awaiting processing or handling, i.e., that the information about the interrupt is present in the location in the virtual APIC backing page for the guest operating system. For example, in some embodiments, when the guest operating system is "active," i.e., when program code for the guest operating system is presently being executed by a processor core (e.g., core 418) in the electronic device (and the guest operating system is not halted or otherwise not being executed in favor of other program code), communicating the interrupt includes sending a corresponding signal to the executing processor core from the IOMMU. For instance, sending the signal can include one or more of writing to a shared mailbox memory location, asserting a signal on a specified signal line, sending a packet to the processor core on a communication bus, etc. As another example, in some embodiments, when the guest operating system is "inactive," i.e., when program code for the guest operating system is not presently being executed by the processor core (and the guest operating system is halted or otherwise not being executed in favor of other program code), communicating the interrupt includes adding an entry to a guest virtual APIC log, which is a record of pending interrupts to be processed or handled by the guest operating system. The IOMMU then sends an indication of the addition of the entry to the guest virtual APIC log to the processor via a shared mailbox memory location, asserting a signal on a specified signal line, etc. The hypervisor then triggers the guest operating system to process or handle the interrupt from the virtual APIC backing page upon reactivating the guest operating system—and may reactivate the guest operating system specifically to process or handle the interrupt.

The guest operating system then acquires the information about the interrupt from the location in the virtual APIC backing page (step 808) and uses the information about the interrupt to process or handle the interrupt (step 810). For this operation, the guest operating system retrieves the information from the location in the virtual APIC backing page via one or more memory reads. The guest operating system then processes or handles the interrupt by executing interrupt handling program code, performing corresponding operations, terminating one or more operations, notifying a processor core that is executing the guest operating system of the occurrence of the interrupt, signaling the occurrence of the interrupt to the hypervisor or an operating system, etc.

Interrupts that are not Communicated from the IOMMU Directly to Guest Operating Systems As described above, the IOMMU uses the virtual APIC backing pages for guest operating systems to directly signal IOMMU-sourced interrupts to guest operating systems (i.e., without hypervisor assistance in writing to the virtual APIC backing pages, etc.). In some cases, however, IOMMU-sourced interrupts are not permitted to be communicated directly from the IOMMU to guest operating systems. For example, a guest operating system may be configured (e.g., using software switches, configuration values, etc.) not to accept IOMMU-sourced interrupts directly from the IOMMU for security reasons, efficiency, etc. In such cases, the IOMMU uses a different mechanism for signaling IOMMU-sourced interrupts to guest operating systems. For example, in some embodiments, when the IOMMU is unable to communicate IOMMU-sourced interrupts directly to guest operating systems, the IOMMU uses an intermediary interrupt communication mechanism for indirectly signaling, via an intermediary entity, IOMMU-sourced interrupts to the guest operating systems.

In some embodiments, the intermediary entity that the IOMMU uses for signaling interrupts to guest operating systems is or includes a guest interrupt log. The guest interrupt log is a table, buffer, etc. in which information about interrupts is stored for eventual processing by a guest operating system with the assistance of the hypervisor (and/or another entity). During operation, after determining that a given guest operating system cannot accept IOMMU-sourced interrupts directly from the IOMMU, the IOMMU writes information about an interrupt in the guest interrupt log for the given guest operating system. The IOMMU then signals the hypervisor that information was written to the guest interrupt log and/or the hypervisor detects the write of the guest interrupt log, which causes the hypervisor to forward or otherwise communicate the interrupt to the guest operating system (e.g., via writing the interrupt to the virtual APIC backing page for the guest operating system). The given guest operating system then processes the interrupt.

In some embodiments, an electronic device (e.g., electronic device 400 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), caches/cache controllers, memories/memory controllers, functional blocks, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 400, IOMMU 424, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
 a processor that executes a guest operating system;
 a memory, the memory having a guest portion that is reserved for storing data and information to be accessed by the guest operating system; and
 an input-output memory management unit (IOMMU) configured to:
  signal an interrupt to the guest operating system by:
   acquiring, from an entry in an interrupt remapping table associated with the guest operating system, a location in a virtual advanced programmable interrupt controller (APIC) backing page for the guest operating system in the guest portion of the memory;
   writing information about the interrupt to the location in the virtual APIC backing page; and
   communicating an indication of the interrupt to the guest operating system.

2. The electronic device of claim 1, wherein, when acquiring the location in the virtual APIC backing page from the entry in the interrupt remapping table, the IOMMU is configured to:
  acquire, from a device table entry associated with the IOMMU, a base address of the interrupt remapping table;
  use the base address and a guest operating system identifier (ID) to determine the entry in the interrupt remapping table; and
  retrieve, from the entry in the interrupt remapping table, an address of the location in the virtual APIC backing page.

3. The electronic device of claim 2, wherein:
  the virtual APIC backing page in the guest portion of the memory includes a plurality of locations, each location among the plurality of locations associated with a different type of interrupt, and the interrupt remapping table includes a separate entry for storing an indicator of each of the plurality of locations; and
  when acquiring the location in the virtual APIC backing page from the interrupt remapping table entry, the IOMMU is configured to:
    use a type of the interrupt along with the base address and the guest operating system ID to determine the entry in the interrupt remapping table.

4. The electronic device of claim 2, wherein:
  the interrupt remapping table includes a hierarchy of at least two sub-tables, each sub-table other than a final sub-table in the hierarchy of sub-tables including an identifier for a next sub-table in the hierarchy, and the final sub-table including the address of the location in the virtual APIC backing page; and
  when using the base address and a guest operating system ID to determine the entry in the interrupt remapping table, the IOMMU is configured to use corresponding portions of the base address and/or the guest operating system ID to proceed through the hierarchy of sub-tables to the final sub-table.

5. The electronic device of claim 1, wherein the IOMMU is further configured to:
  determine whether the interrupt is permitted to be communicated directly from the IOMMU to the guest operating system; and
    when the interrupt is permitted to be communicated directly, signaling the interrupt to the guest operating system; and
    when the interrupt is not permitted to be communicated directly, using one or more intermediary interrupt communication mechanisms for indirectly signaling the interrupt to the guest operating system.

6. The electronic device of claim 5, wherein, when determining whether the interrupt is permitted to be communicated directly, the IOMMU is configured to:
  check one or more settings in a device table entry associated with the IOMMU to determine whether:
    IOMMU communication of interrupts is enabled; and/or
    the guest operating system is configured to receive interrupts from the IOMMU.

7. The electronic device of claim 5, wherein the one or more intermediary interrupt communication mechanisms include a guest interrupt log and the IOMMU is further configured to:
  store information about the interrupt in the guest interrupt log;
  wherein a hypervisor executed by the processor detects or is informed of the IOMMU's storage of the information about the interrupt in the guest interrupt log and indicates the interrupt to the guest operating system.

8. The electronic device of claim 1, wherein the processor executes a hypervisor that initializes and maintains the interrupt remapping table by storing, in corresponding entries in the interrupt remapping table, identifiers for locations in virtual APIC backing pages for guest operating systems in respective guest portions of the memory.

9. The electronic device of claim 1, wherein communicating the indication of the interrupt to the guest operating system comprises:
  when the guest operating system is presently active:
    sending an interrupt to the processor.

10. The electronic device of claim 1, wherein communicating the indication of the interrupt to the guest operating system comprises:
  when the guest operating system is not presently active:
    adding an entry to a guest virtual APIC log; and
    sending an indication of the addition of the entry to the guest virtual APIC log to the processor.

11. The electronic device of claim 1, wherein, based on receiving the indication of the interrupt on behalf of the guest operating system, the processor is configured to process the interrupt for the guest operating system by:
  acquiring the information about the interrupt from the location in the virtual APIC backing page; and
  using the information about the interrupt to process or handle the interrupt.

12. The electronic device of claim 1, wherein the interrupt is an IOMMU-sourced interrupt.

13. A method for signaling interrupts in an electronic device that comprises a processor that executes a guest operating system; a memory having a guest portion that is reserved for storing data and information to be accessed by the guest operating system; and an input-output memory management unit (IOMMU), the method comprising:
  signaling, by the IOMMU, an interrupt to the guest operating system by:
    acquiring, by the IOMMU, from an entry in an interrupt remapping table associated with the guest operating system, a location in a virtual advanced programmable interrupt controller (APIC) backing page for the guest operating system in the guest portion of the memory;
    writing, by the IOMMU, information about the interrupt to the location in the virtual APIC backing page; and
    communicating, by the IOMMU, an indication of the interrupt to the guest operating system.

14. The method of claim 13, wherein acquiring the location in the virtual APIC backing page from the entry in the interrupt remapping table comprises:
  acquiring, by the IOMMU, from a device table entry associated with the IOMMU, a base address of the interrupt remapping table;
  using, by the IOMMU, the base address and a guest operating system identifier (ID) to determine the entry in the interrupt remapping table; and
  retrieving, by the IOMMU, from the entry in the interrupt remapping table, an address of the location in the virtual APIC backing page.

15. The method of claim 14, wherein:
  the virtual APIC backing page in the guest portion of the memory includes a plurality of locations, each location among the plurality of locations associated with a different type of interrupt, and the interrupt remapping table includes a separate entry for storing an indicator of each of the plurality of locations; and acquiring the location in the virtual APIC backing page from the interrupt remapping table entry comprises:
using, by the IOMMU, a type of the interrupt along with the base address and the guest operating system ID to determine the entry in the interrupt remapping table.

16. The method of claim 14, wherein:

the interrupt remapping table includes a hierarchy of at least two sub-tables, each sub-table other than a final sub-table in the hierarchy of sub-tables including an identifier for a next sub-table in the hierarchy, and the final sub-table including the address of the location in the virtual APIC backing page; and using the base address and a guest operating system ID to determine the entry in the interrupt remapping table comprises:
using, by the IOMMU, corresponding portions of the base address and/or the guest operating system ID to proceed through the hierarchy of sub-tables to the final sub-table.

17. The method of claim 13, further comprising:
determining, by the IOMMU, whether the interrupt is permitted to be communicated directly from the IOMMU to the guest operating system; and
when the interrupt is permitted to be communicated directly, signaling, by the IOMMU, the interrupt to the guest operating system; and
when the interrupt is not permitted to be communicated directly, using one or more intermediary interrupt communication mechanisms for indirectly signaling, by the IOMMU, the interrupt to the guest operating system.

18. The method of claim 17, wherein determining whether the interrupt is permitted to be communicated directly comprises:
checking, by the IOMMU, one or more settings in a device table entry associated with the IOMMU to determine whether:
IOMMU communication of interrupts is enabled; and/or
the guest operating system is configured to receive interrupts from the IOMMU.

19. The method of claim 17, wherein the one or more intermediary interrupt communication mechanisms include a guest interrupt log and the method further comprises:
storing, by the IOMMU, information about the interrupt in the guest interrupt log;
wherein a hypervisor executed by the processor detects or is informed of the IOMMU's storage of the information about the interrupt in the guest interrupt log and indicates the interrupt to the guest operating system.

20. The method of claim 13, wherein the processor executes a hypervisor and the method further comprises:
initializing and maintaining, by the hypervisor, the interrupt remapping table by storing, in corresponding entries in the interrupt remapping table, identifiers for locations in virtual APIC backing pages for guest operating systems in respective guest portions of the memory.

21. The method of claim 13, wherein communicating the indication of the interrupt to the guest operating system comprises:
when the guest operating system is presently active:
sending, by the IOMMU, an interrupt to the processor.

22. The method of claim 13, wherein communicating the indication of the interrupt to the guest operating system comprises:
when the guest operating system is not presently active:
adding, by the IOMMU, an entry to a guest virtual APIC log; and
sending, by the IOMMU, an indication of the addition of the entry to the guest virtual APIC log to the processor.

23. The method of claim 13, wherein, based on receiving the indication of the interrupt on behalf of the guest operating system, the processor is configured to process the interrupt for the guest operating system by:
acquiring the information about the interrupt from the location in the virtual APIC backing page; and
using the information about the interrupt to process or handle the interrupt.

24. The method of claim 13, wherein the interrupt is an IOMMU-sourced interrupt.

* * * * *